United States Patent [19]

Panzer

[11] Patent Number: 4,503,536
[45] Date of Patent: Mar. 5, 1985

[54] DIGITAL CIRCUIT UNIT TESTING SYSTEM UTILIZING SIGNATURE ANALYSIS

[75] Inventor: Gary W. Panzer, Alta Loma, Calif.

[73] Assignee: General Dynamics, Pomona, Calif.

[21] Appl. No.: 417,798

[22] Filed: Sep. 13, 1982

[51] Int. Cl.³ .................... G06F 11/00; G01R 31/28
[52] U.S. Cl. .................. 371/25; 324/73 R; 371/26
[58] Field of Search ............. 371/25, 24, 26, 27; 364/580; 324/73 R

[56] References Cited

U.S. PATENT DOCUMENTS

| | | | |
|---|---|---|---|
| 3,082,374 | 3/1963 | Buuck | 324/73 |
| 3,302,109 | 1/1967 | Jones | 324/73 |
| 3,573,751 | 4/1971 | DeLisle | 371/25 X |
| 3,651,315 | 3/1972 | Collins | 235/151.31 |
| 3,659,087 | 4/1972 | Green et al. | 235/151.3 |
| 3,777,129 | 12/1973 | Mehia | 235/151.3 |
| 3,787,669 | 1/1974 | Muehldorf | 235/152 |
| 4,066,882 | 1/1978 | Esposito | 371/26 |
| 4,168,527 | 9/1979 | Winkler | 364/580 |
| 4,189,778 | 2/1980 | Vogel | 364/482 |
| 4,192,451 | 3/1980 | Swerling et al. | 324/73 R X |
| 4,216,374 | 8/1980 | Lam et al. | 371/25 |
| 4,224,690 | 9/1980 | Rockwell | 371/25 |
| 4,255,792 | 3/1981 | Das | 364/580 |
| 4,271,472 | 6/1981 | Saunders et al. | 364/481 |
| 4,277,831 | 7/1981 | Saunders et al. | 364/481 |
| 4,441,074 | 4/1984 | Bockett-Pugh et al. | 324/73 R |

OTHER PUBLICATIONS

Whitley, Testing System for Manufactured Circuit Cards, IBM Technical Disclosure Bulletin, vol. 22, No. 6, p. 2221, 11/79.
Rossero, Module Test With Computer Simulator and Random Pattern Generator, IBM Technical Disclosure Bulletin, vol. 25, No. 5, p. 2385, 10/82.
Palmquest, Logic Analyzer Delivers Test Patterns Too, Electronics, vol. 54, No. 18, p. 113, Sep. 8, 1981.
Sand, "Diode Matrix Replacement by Programmable Read Only Memories for Image Analyzer Control", Microscope, vol. 25, No. 1, (1977), pp. 47–53.

*Primary Examiner*—Jerry Smith
*Assistant Examiner*—Mark Ungerman
*Attorney, Agent, or Firm*—Neil F. Martin; Edward W. Callan; Edward B. Johnson

[57] ABSTRACT

A system for testing digital circuit units at the design speed of the circuit. A first memory stores a minimized set of optimum generated predetermined test patterns for application to a unit under test. A second memory stores expected signature patterns corresponding to signature patterns that are derived from the unit under test in response to the predetermined test patterns when the unit under test is functioning properly. A signature analyzer derives signature patterns from a unit under test in response to the application of the test patterns to the unit. A comparator compares the derived signature patterns with the expected signature patterns and provides an indication of the results of the comparison. A clock provides a clock signal having a pulse rate that corresponds to the design speed of the unit under test; and a sequential counter responds to said clock signal by providing a sequential count to the first memory for addressing the first memory at storage positions therein having addresses corresponding to the sequential count to cause the predetermined test patterns to be read from the first memory and applied to the unit at a speed that corresponds to the design speed of the unit under test. The testing system further includes a backtracing system for enabling determination of the location of faults in the unit under test.

7 Claims, 3 Drawing Figures

DIGITAL CIRCUIT UNIT TESTING SYSTEM UTILIZING SIGNATURE ANALYSIS

BACKGROUND OF THE INVENTION

The present invention generally pertains to systems for testing digital circuit units and is particularly directed to an improved digital circuit unit testing system utilizing signature analysis.

Signature analysis is a testing technique in which predetermined test patterns are applied to a unit under test, and the signals derived from various terminals and internal nodes of the unit in response to the test patterns are compressed and processed to provide a four-character signature. There are four bits for each character. The test patterns are calculated for maximum fault coverage by a computer. Signature analysis is fast and repeatable; and it provides extremely accurate results.

As digital circuit units continue to become more complex with the advent of microprocessors and very-large-scale integration (VLSI) devices, the number of predetermined test patterns that are needed for signature analysis testing becomes prohibitively larger in that tests of longer duration are required to maintain the level of accuracy associated with signature analysis testing. Such complexity also makes it more difficult to determine the location of faults in the unit under test. In addition, there is a considerable variation in the design speed of operation of the many different types of digital circuit units.

SUMMARY OF THE INVENTION

The present invention provides an improved system for testing digital circuit units by signature analysis at the design speed of the circuit units.

The system includes a first memory for storing predetermined test patterns for application to a unit under test; a second memory for storing expected signature patterns corresponding to signature patterns that are derived from the unit under test in response to the predetermined test patterns when the unit under test is functioning properly; a signature analyzer for deriving signature patterns from a unit under test in response to the application of the test patterns to the unit under test; a comparator for comparing the derived signature patterns with the expected signature patterns and for providing an indication of the results of the comparison; and an addressing system for addressing the first memory to apply the test patterns to the unit under test at a speed that corresponds to the design speed of the unit under test.

The system for addressing the first memory preferably includes a clock for providing a clock signal having a pulse rate that corresponds to the design speed of the unit under test; and a sequential counter responsive to the clock signal for providing a sequential count to the first memory for addressing the first memory at storage positions therein having addresses corresponding to the sequential count to cause the predetermined test patterns to be read from the first memory and applied to the unit under test at a speed that corresponds to the design speed of the unit under test. The clock component can be changed readily to make the system useful for testing many different units having their own unique design speeds of operation.

In the system of the present invention the first memory preferably contains a minimized set of optimum test patterns generated by a computer. As a result the system of the present invention does not require a prohibitive number of test patterns to assume the high degree of accuracy associated with signature analysis testing.

The system of the present invention also preferably includes backtracing means for enabling determination of the location of faults in a unit under test. The backtracing system preferably includes a third memory for storing expected signature patterns corresponding to signature patterns that are derived from selected terminals and internal nodes of the unit under test in response to the predetermined test patterns when the unit under test is functioning properly; a second signature analyzer for deriving signature patterns from selected terminals and internal nodes of the unit under test in response to the application of the test patterns to the unit under test; a second comparator for comparing the derived signature patterns derived by the second signature analyzer with the expected signature patterns in the third memory and for providing an indication of the results of the comparison; probes for connecting the second signature analyzer directly to selected terminals and internal nodes of the unit under test; a fourth memory storing a correlation between various terminals and internal nodes in the unit under test from which the signature patterns are derived and other internal nodes in the unit under test to which the second signature analyzer should be coupled when the second comparator indicates a fault upon the second signature analyzer being connected directly to one of the various terminals and internal nodes; and a data processor coupled to the second comparator and to the fourth memory for providing an indication of one of the other internal nodes to which the second signature analyzer should be coupled in accordance with the indications provided by the second comparator.

Other features of the present invention are described in relation to the description of the preferred embodiment.

DESCRIPTION OF THE PREFERRED EMBODIMENTS

Figure 1:
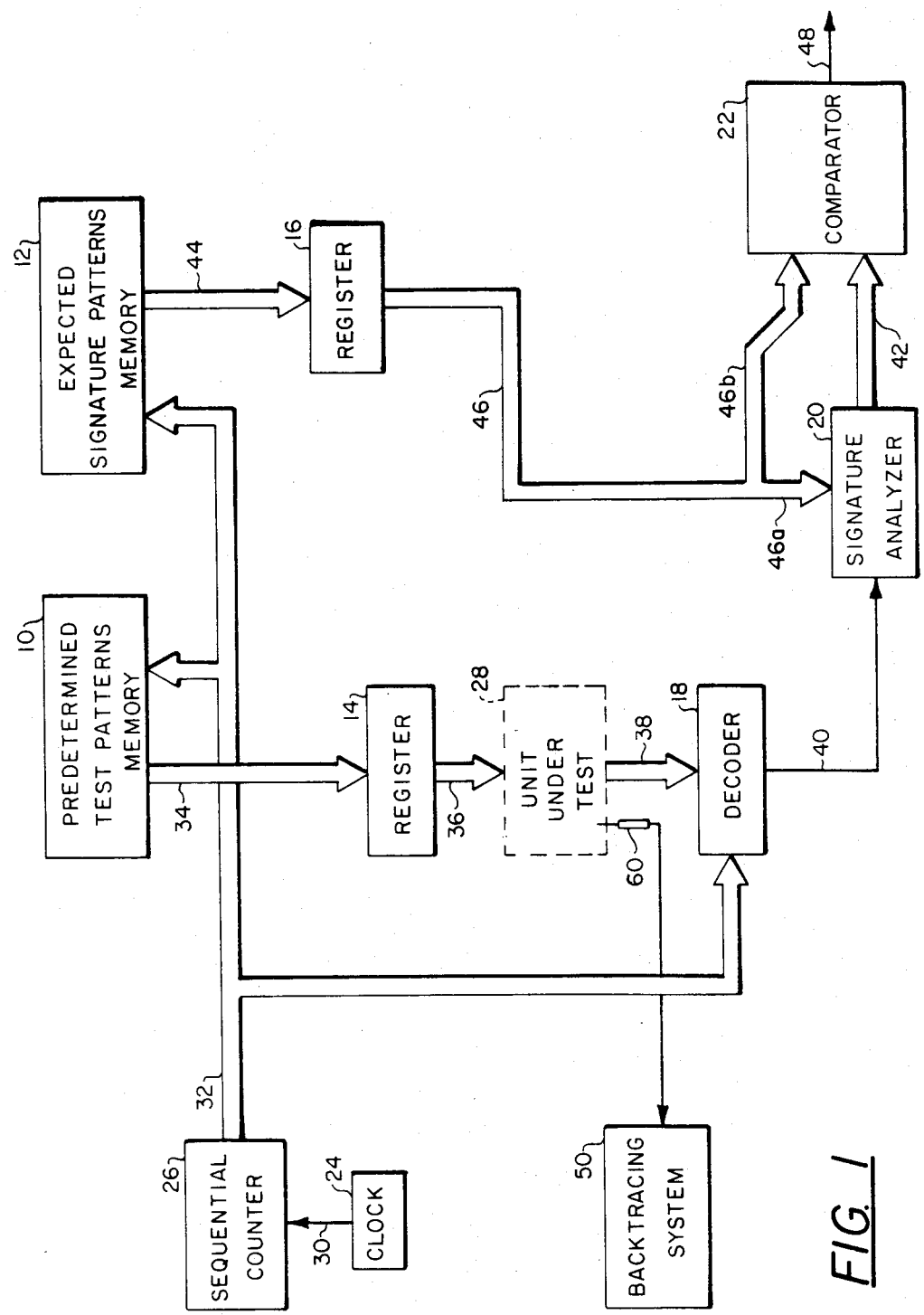
FIG. 1 is a block diagram of a preferred embodiment of the system of the present invention.

Referring to FIG. 1, the preferred embodiment of the present invention includes a first memory 10, a second memory 12, a first register 14, a second register 16, a decoder 18, a signature analyzer 20, a comparator 22 and an addressing system. The addressing system includes a clock 24 and a sequential counter 26.

The first memory 10 stores a minimized set of optimum predetermined test patterns for application to a unit under test 28. The minimized set of optimum test patterns is pseudo-randomly generated by a computer. Various techniques for selecting a minimized set of optimum test patterns are available. Hewlett Packard Company, Palo Alto, Calif., provides one such technique under the trade designation "Testaid"; and Control Data Corporation, Minneapolis, Minn., provides another such technique under the trade designation "CC-Tegas". The patterns in the minimized set are selected on the basis of their use resulting in the detection of faults. These test patterns are generated for application to the unit under test 28 at the design speed of the unit under test 28.

Accordingly, the addressing system 24, 26 addresses the first memory 10 to apply the test patterns to the unit under test 28 at a speed that corresponds to the design speed of the unit under test 28. The clock 24 provides a clock signal on line 30 having a pulse rate that corresponds to the design speed of the unit under test 28. The sequential counter 26 responds to the clock signal on line 30 by providing a sequential count on lines 32 to the first memory 10 for addressing the first memory 10 at storage positions therein having addresses corresponding to the sequential count to cause the predetermined test pattern signals to be read from the first memory 10 onto lines 34 and applied to the unit under test 28 at a speed that corresponds to the design speed of the unit under test 28.

The register 14 stabilizes the test pattern signals on lines 34 and provides them over lines 36 to the unit under test 28.

The unit under test 28 responds to the predetermined test patterns on lines 36 by providing output signals from its terminals on lines 38.

The decoder 18 responds to the address signals on lines 32 by causing the output signal on a selected one of the terminals of the unit under test 28 to be provided on line 40 to the signature analyzer 20.

The signature analyzer 20 is a serial register with feedback and control circuitry. The signature analyzer 20 derives signature patterns from the output signals provided on line 40 from the unit under test 28, and provides derived signature pattern signals on lines 42 to the comparator 22.

The second memory 12 stores expected signature patterns corresponding to signature patterns that are derived from the unit under test 28 in response to the predetermined test patterns when the unit under test 28 is functioning properly. The expected signature patterns are generated by a computer. The second memory 12 also is addressed by the sequential count address signals on lines 32 and responds to predetermined addresses on lines 32 by providing expected signature pattern signals and control signals on lines 44 to the register 16.

The register 16 stabilizes the expected signature pattern signals and the control signals on lines 44 and provides them over lines 46 to the comparator 22 and the signature analyzer 20.

The stop and start timing of the signature analyzer 20 is controlled in response to receipt of the control signals on line 46a.

The comparator 22 compares the derived signature pattern signals on lines 42 with the expected signature pattern signals on lines 46b and provides a signal indicating the results of such comparison on line 48. Such indication is one of either "fault" or "no fault" in relation to the unit under test 28. Indicator lamps (not shown) are lit in response to the indication signal on line 48.

Figure 2:
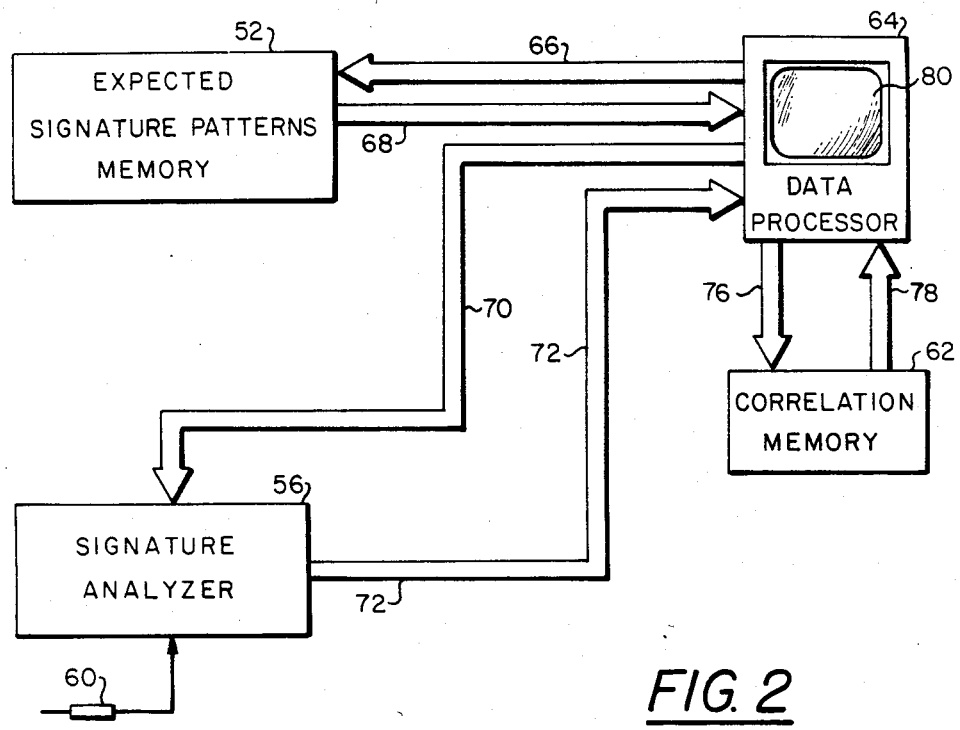
FIG. 2 is a block diagram of a preferred embodiment of the backtracing system included in the system of FIG. 1.

The testing system of the present invention further includes backtracing means 50 for enabling determination of the location of faults in the unit under test 28. Referring to FIG. 2, the backtracing means includes a third memory 52, a second signature analyzer 56, a probe 60, a fourth memory 62 and a data processor 64.

The third memory 52 stores control signals and expected signature patterns corresponding to signature patterns that are derived from selected terminals and internal nodes of the unit under test 28 in response to the predetermined test patterns when the unit under test 28 is functioning properly. The expected signature patterns are generated by a computer.

The third memory 52 is addressed by selected address signals provided on lines 66 from the data processor 64, and responds to the selected address signals on lines 66 by providing expected signature pattern signals on lines 68 to the data processor 64.

The probe 60 is used for connecting the second signature analyzer 56 directly to selected terminals and internal nodes of the unit under test 28.

The second signature analyzer 56 is a serial register with feedback and control circuitry. The second signature analyzer 56 derives signature patterns from the selected terminals and internal nodes of the unit under test 28 in response to the application of the test patterns to the unit under test 28, and provides derived signature pattern signals on lines 72 to the data processor 64. The stop and start timing of the second signature analyzer 56 is controlled in response to the receipt of control signals on lines 70 from the data processor 64.

The data processor 64 compares the derived signature pattern signals on lines 72 with the expected signature pattern signals on lines 68 and provides an indication of the results of such comparison. Such indication is one of either "fault" or "no fault" in relation to the unit under test 28. The "fault" or "no fault" indication is displayed on a display screen 80 of the data processor 64.

The fourth memory 62 stores a correlation between various terminals and internal nodes in the unit under test 28 from which signature patterns are derived, and other internal nodes in the unit under test 28 to which the second signature analyzer 56 should be coupled when the data processor 64 indicates a fault by the indication on the display screen 80 upon the second signature analyzer 56 being connected directly to one of the various terminals and internal nodes of the unit under test 28.

The fourth memory 62 is addressed by address signals on lines 76 from the data processor 64, and responds thereto by providing correlation signals on lines 78 to the data processor 64. The data processor 64 responds to the correlation signals on lines 78 by causing an indication to be displayed on the display screen 80 to instruct an operator to connect the probe 60 to a selected terminal or internal node of the unit under test 28, and by providing address signals on lines 66 to the third memory 52 to extract from the third memory 52 expected signature pattern signals corresponding to the signature pattern signals that are derived by the second signature analyzer 56 from the selected terminal or internal node of the unit under test 28 when the unit under test 28 is functioning properly. The correlation signals are stored temporarily in the data processor 64 and cause the data processor 64 to respond to the subsequent "fault" or "no fault" indication by generating the next address signal on lines 76 to the fourth memory 62. The backtracing testing sequence defined by the correlation stored in the fourth memory 62 is a branching sequence that continues until a component of the unit under test 28 is isolated and identified as a faulty component.

Figure 3:
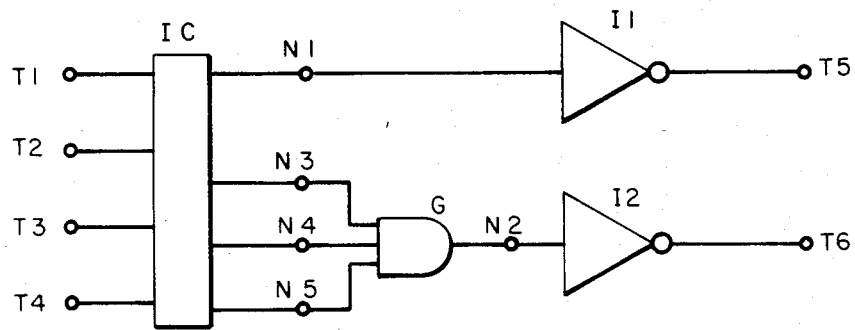
FIG. 3 is a schematic circuit diagram of an exemplary unit under test in the system of FIG. 1.

The backtracing testing sequence is described with reference to FIG. 3, which is a schematic circuit diagram of an exemplary unit under test 28. The unit under test includes four components, to wit: an integrated circuit chip IC, an AND gate G and two inverters I1 and I2. The test pattern signals on lines 36 are applied to input terminals T1, T2, T3 and T4. The probe 60 is coupled to either output terminal T5 or T6 to provide output signals to the second signature analyzer 56.

When the operation of the backtracing system 50 is initiated, the data processor 64 always addresses a predetermined location in the fourth memory 62 for causing a predetermined correlation signal to be provided to the data processor 64 to cause a selected terminal, such as terminal T5, to be indicated on the display screen 80 as the selected terminal of the unit under test 28 to which the probe 60 should be connected. The operator then connects the probe to terminal T5 and the backtracing system 50 operates to cause derived signature pattern signals to be provided on lines 72 for comparison by data processor 64 with the expected signature pattern signals from the third memory 52. The data processor 64 responds to such comparison by indicating either a "fault" or "no fault". If a fault is indicated, the data processor 64 addresses the fourth memory 62 to cause a correlation signal to be provided on lines 78 to the data processor 64 that causes node N1 to be indicated on the display screen 80 as the next selected internal node to which the probe 60 should be connected. If "no fault" is indicated following connection of the probe 60 to the internal node N1, it is thereby determined that the inverter I1 is faulty.

If no fault is indicated following connection of the probe 60 to the terminal T5, the data processor 64 addresses the fourth memory 62 to cause a correlation signal to be provided on lines 78 to 25 the data processor 64 that causes terminal T6 to be indicated on the display screen 80 as the next terminal to which the probe 60 should be connected.

Following a "fault" indication when the probe is connected to terminal T6, an indication is displayed on the display screen 80 instructing the operator to connect the probe to internal node N2.

If a "no fault" indication is provided following connection of the probe 60 to the internal node N2, it is thereby determined that the inverter I2 is faulty. If a "fault" is still indicated when the probe 60 is connected to the internal node N2, an indication is displayed on the screen 80 instructing the operator to connect the probe to internal nodes N3, N4 and N5 in sequence.

If "no fault" indications are provided following the sequential connection of the probe 60 to internal nodes N3, N4 and N5, it is thereby determined that the AND gate G is faulty.

If a "fault" indication is provided following the connection of the probe 60 to any of the internal nodes N1, N3, N4 or N5, it is thereby determined that the integrated circuit chip IC is faulty.

In one preferred embodiment, the memories 10, 12, 52 and 62 are programmable read-only memories (PROMs). Alternatively, the memories 10, 12, 52 and 62 include random access memories (RAMs) so that the contents stored therein can be changed easily when utilizing the testing system of the present invention for testing different types of digital circuit units.

What is claimed is:

1. A system for testing digital circuit units at the design speed of the circuit units, comprising
   a first memory for storing a computer generated minimized set of optimum predetermined test patterns for application to a unit under test;
   a second memory for storing computer generated expected signature patterns which correspond to signature patterns that would be derived from a properly functioning unit under test in response to the predetermined test patterns;
   a signature analyzer for deriving signature patterns from a unit under test in response to the application of said test patterns to said unit;
   a comparator for comparing said derived signature patterns with said expected signature patterns and for providing an indication of the results of said comparison; and
   means for addressing the first and second memories, the address means for addressing the first memory so as to apply said test patterns to said unit under test at a speed that corresponds to the design speed of the unit under test and the address means for addressing the second memory so as to apply said expected signature patterns to said comparator.

2. A system according to claim 1, wherein the addressing means include
   a clock for providing a clock signal having a pulse rate that corresponds to the design speed of the unit under test; and
   a sequential counter responsive to said clock signal for providing a sequential count to the first memory for addressing the first memory at storage positions therein having addresses corresponding to said sequential count to cause said predetermined test patterns to be read from the first memory and applied to said unit at a speed that corresponds to the design speed of the unit under test.

3. The system according to claim 2 wherein the addressing means sequential counter in response to said clock signal provides said sequential count to the second memory for addressing the second memory at storage positions therein having addresses corresponding to said sequential count to cause said expected signature patterns to be read from the second memory and applied to the comparator.

4. A system according to claim 1 or 3, further comprising
   backtracing means for enabling determination of the location of faults in the unit under test.

5. A system according to claim 4, wherein the backtracing means comprises
   a third memory for storing computer generated expected signature patterns which correspond to signature patterns that would be derived from selected terminals and internal nodes of a properly functioning unit under test in response to the predetermined test patterns,
   a second signature analyzer for deriving signature patterns from selected terminals and internal nodes of the unit under test in response to the application of said test patterns to said unit;
   a data processor for addressing the third memory which responds with said expected signature patterns, for comparing said signature patterns derived by the second signature analyzer with said expected signature patterns from the third memory, and for providing an indication of the results of said comparison;
   means for connecting the second signature analyzer directly to selected terminals and internal nodes of the unit under test; and
   a fourth memory for storing correlations of various terminals and internal nodes in the unit under test, from which the signature patterns are derived, to other internal nodes in the unit under test to which the second signature analyzer should be coupled when the data processor indicates a fault upon the second signature analyzer being connected directly to one of said various terminals and internal nodes; wherein the data processor is coupled to the fourth memory for providing an indication of one of said other internal nodes to which the second signature analyzer should be coupled in accordance with the indication of the results of said comparison.

6. A system according to claim 5, wherein the memories include RAMs.

7. A system according to claim 1, wherein the memories include RAMs.

* * * * *